(12) United States Patent
Noro et al.

(10) Patent No.: US 7,061,196 B2
(45) Date of Patent: Jun. 13, 2006

(54) POWER WINDOW SYSTEM

(75) Inventors: Yoshiki Noro, Wako (JP); Kenji Shioiri, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/089,859

(22) Filed: Mar. 25, 2005

(65) Prior Publication Data
US 2005/0212470 A1    Sep. 29, 2005

(30) Foreign Application Priority Data
Mar. 26, 2004   (JP)   .............................. 2004-092601

(51) Int. Cl.
*H02P 1/04* (2006.01)

(52) U.S. Cl. ...................... 318/443; 318/445; 318/466; 318/280; 318/432

(58) Field of Classification Search ................ 318/443, 318/445, 466, 468, 280–283, 432, 434
See application file for complete search history.

(56) References Cited

U.S. PATENT DOCUMENTS

| | | | | |
|---|---|---|---|---|
| 5,129,192 A | * | 7/1992 | Hannush | 49/349 |
| 5,537,013 A | * | 7/1996 | Toyozumi et al. | 318/283 |
| 5,627,411 A | * | 5/1997 | Bochenek | 307/10.1 |
| 5,698,907 A | * | 12/1997 | Weber | 307/10.1 |
| 5,760,554 A | * | 6/1998 | Bustamante | 318/280 |
| 5,949,207 A | * | 9/1999 | Luebke et al. | 318/446 |
| 6,002,224 A | * | 12/1999 | Stern | 318/280 |
| 6,541,929 B1 | * | 4/2003 | Cregeur | 318/283 |
| 6,833,517 B1 | * | 12/2004 | Sotome et al. | 200/5 R |

FOREIGN PATENT DOCUMENTS

| | | |
|---|---|---|
| JP | 10-331522 | 12/1998 |
| JP | 2000-295879 | 10/2000 |
| JP | 2002-2293 | 1/2002 |

* cited by examiner

*Primary Examiner*—Rina Duda
(74) *Attorney, Agent, or Firm*—Hamre, Schumann, Mueller & Larson, P.C.

(57) ABSTRACT

A power window system includes: an open/close switch that is provided to each of a plurality of vehicle seats for issuing an open/close instruction to the corresponding seat windows; a control device for controlling the open/close operation of the seat windows based on the operation of the open/close switch, and is configured by as many control sections as the vehicle seats with a one-to-one relationship therebetween, i.e., a master controller and a plurality of sub controllers; and a communications unit for carrying out communications between the control section at a driver seat and the control sections at the remaining seats. The sub controllers at the seats other than the driver seat are each provided with an operation command section, operating when normal communications is not available with the master controller at the driver seat, even if a close signal is issued from the open/close switches. In such a case, the operation command section forwards a command to the corresponding motor control section to move the seat window in a direction to close it by a predetermined amount.

2 Claims, 15 Drawing Sheets

POWER WINDOW SYSTEM

FIELD OF THE INVENTION

The present invention relates to power window systems and, more specifically, to a power window system suitable for automatically opening and closing seat windows of a vehicle by a motor.

BACKGROUND OF THE INVENTION

A power window system in a vehicle is installed to electrically open and close the seat windows in response to operation of switches provided at each respective vehicle seat. In such a power window system, a vehicle passenger operates his or her seat switch so that the motor drives a slide member of a regulator up or down to open or close the corresponding seat window.

The conventional technology related to the power window system is found, for example, in JP-A-10-331522, JP-A-2000-295879, and JP-A-2002-2293.

The technology described in JP-A-10-331522 relates to a power window control system having an automatic-reverse feature. The power window control system reads a door open/close signal and controls the automatic-reverse feature so as not to activate for a predetermined length of time after the vehicle door(s) are opened or closed.

The technology described in JP-A-2000-295879 relates to a method for driving and controlling an open/close object such as a power window of a vehicle. In the method, a determination is made whether there is anything blocking the open/close object from opening or closing through drive control thereover. A motor rotation signal is also counted, and the result is extracted as data indicating the actual position of the open/close object. When the power is OFF, data indicating the standstill position of the open/close object is written into storage memory. In this manner, the control process is to be simplified to detect the open/close position of the open/close object, and the memory is to have longer life for storing the standstill position of the open/close object.

The technology described in JP-A-2002-2293 relates to a system for exercising control over an open/close object exemplified by a vehicle sunroof. The control system is so configured as to properly store and maintain data about the absolute position for resetting a control circuit when a vehicle engine is started. With such a control system, the motor is controlled and forced to stop when a vehicle drive source is activated during motor operation, and then a process is executed for absolute position learning. In this manner, when the vehicle drive source is activated, if the control circuit stops its operation due to the voltage reduction, the motor never fails to stop immediately therebefore. The absolute position data of thus operation-stopped motor is then updated for storage.

In typical power window systems, there is a possibility of trapping passengers' fingers, heads, or others between seat windows and sashes when an up-auto signal is generated through operation of operation switches provided to the respective vehicle seats. The up-auto signal is for automatically closing the corresponding seat window. As a measure to stop such "trapping", the above power window system described in the JP-A-10-331522 or others have the mechanism of making a load detection if trapping occurs between a seat window and sash at the time of up-auto. Through such a detection, the motor is driven in reverse.

The issue here is that the vehicle seat window may not be closed shut if such an automatic-reverse mechanism operates when the window is at its close-up position. The automatic-reverse mechanism is thus so configured as not to work in the vicinity of the close-up position. With such a control system of a power window system, the close-up position of the seat windows has to be known in advance.

There is another type of power window system where an operation switch provided to the driver seat can automatically open and close all seat windows. In such a power window system, however, open/close command signals have to come and go between a master controller at the driver seat and a plurality of sub controllers at the remaining seats, thereby requiring many signal lines for the purpose. The signals coming and going between the master controller and the sub controllers also include ignition switch signals, operation-state-related signals specifically for various operation switches at the driver seat, a keyless entry system, or others. Therefore, the number of signal lines will be quite large for information exchange between the master controller and the sub controllers. In order to decrease the number of signal lines between the master controller and the sub controllers, signal transmission and reception therebetween is performed in serial communications. For serial communications, Local Interconnect Network (LIN) or Controller Area Network (CAN) is used.

The communications between the master controller and the sub controllers is quite high in reliability specifically with their signal transmission/reception and information exchange, but it is not without communications errors or failures. Considered here is a case where some communications error occurs during communications between the master controller and the sub controllers. In such a case, even if the operation switch provided to the driver seat is operated to close the open window at the front passenger seat, an up-auto signal may not be correctly issued from the master controller so that the window is not closed.

Similarly, even if the operation switch provided to the front passenger seat is operated to close its seat window using an up-auto signal coming from the corresponding sub controller, permission may not come from the master controller so that the seat window may not be closed.

With this being the case, the vehicle users will find it inconvenient.

For improvement, a method was developed, providing an AND signal based on: an ON signal of an ignition switch and another ON signal of a main switch. Such signal provision is made via backup lines, each of which establishes a connection between the master controller and one of the sub controllers. This method aims to enable the sub controllers to operate normally even if signals coming from the master controller are impaired. However, the method additionally requires a harness for the backup lines, and a component to be ready for inputs and outputs to/from the respective controllers, thereby increasing the cost. Thus, there is a demand for a system causing no inconvenience to users even if a master controller or others do not operate correctly, without an increase in cost.

SUMMARY OF THE INVENTION

An object of the present invention is to provide a power window system capable of automatically opening and closing a seat window by operating either a switch provided to the corresponding passenger seat or a switch provided to a driver seat through communications lines established among a master controller at the driver seat and a plurality of sub controllers at the remaining seats. With such a power window system, even if some communications error occurs between the master controller and the sub controllers, the passenger seat window can be closed shut without fail by operating the operation switch for the window, with no additional backup line, and with no increase in cost.

In order to achieve the above object, a power window system of the present invention is configured as below.

The power window system is provided with: an open/close switch that is provided to each of a plurality of vehicle seats for issuing an open/close instruction to the corresponding seat window; a control device for controlling the open/close operation of each of the seat windows based on the operation of the corresponding open/close switch, and is configured by as many control sections as the vehicle seats, with a one-to-one relationship therebetween, i.e., a master controller and a plurality of sub controllers; and a communications unit for carrying out communications between the control section at a driver seat and the control sections at the remaining seats. The sub controllers at the seats other than the driver seat are each provided with an operation command section, operating when normal communications is not available with the master controller at the driver seat, even if a close signal is issued from the open/close switches. In such a case, the operation command section forwards a command to a motor control section to move the seat window in a direction to close it by a predetermined amount.

With such a power window system, preferably, the control sections each include a trapping detection section that detects trapping if occurred when the seat window is closed.

According to the present invention, if some communications error occurs with the master controller when a close signal comes from the open/close switches at the vehicle seats, the operation command section operates to forward a command to the corresponding motor control section to move the corresponding seat window in a direction to close it by a predetermined amount. With such a structure, even if some error occurs to communications lines, the window close-up operation can be completed as a fail-safe mode by operating the switches. This requires no additional harness or hardware for the control device, thereby causing no cost increase. Accordingly, fail-safe works well without the cost increase often resulting from provision of harnesses.

BRIEF DESCRIPTION OF THE DRAWINGS

The above-described object and features of the present invention will become more apparent from the following detailed description of a preferred embodiment when taken in conjunction with the accompanying drawings.

DESCRIPTION OF THE PREFERRED EMBODIMENT

In the below, a preferred embodiment of the present invention is described based on the accompanying drawings.

Figure 1:
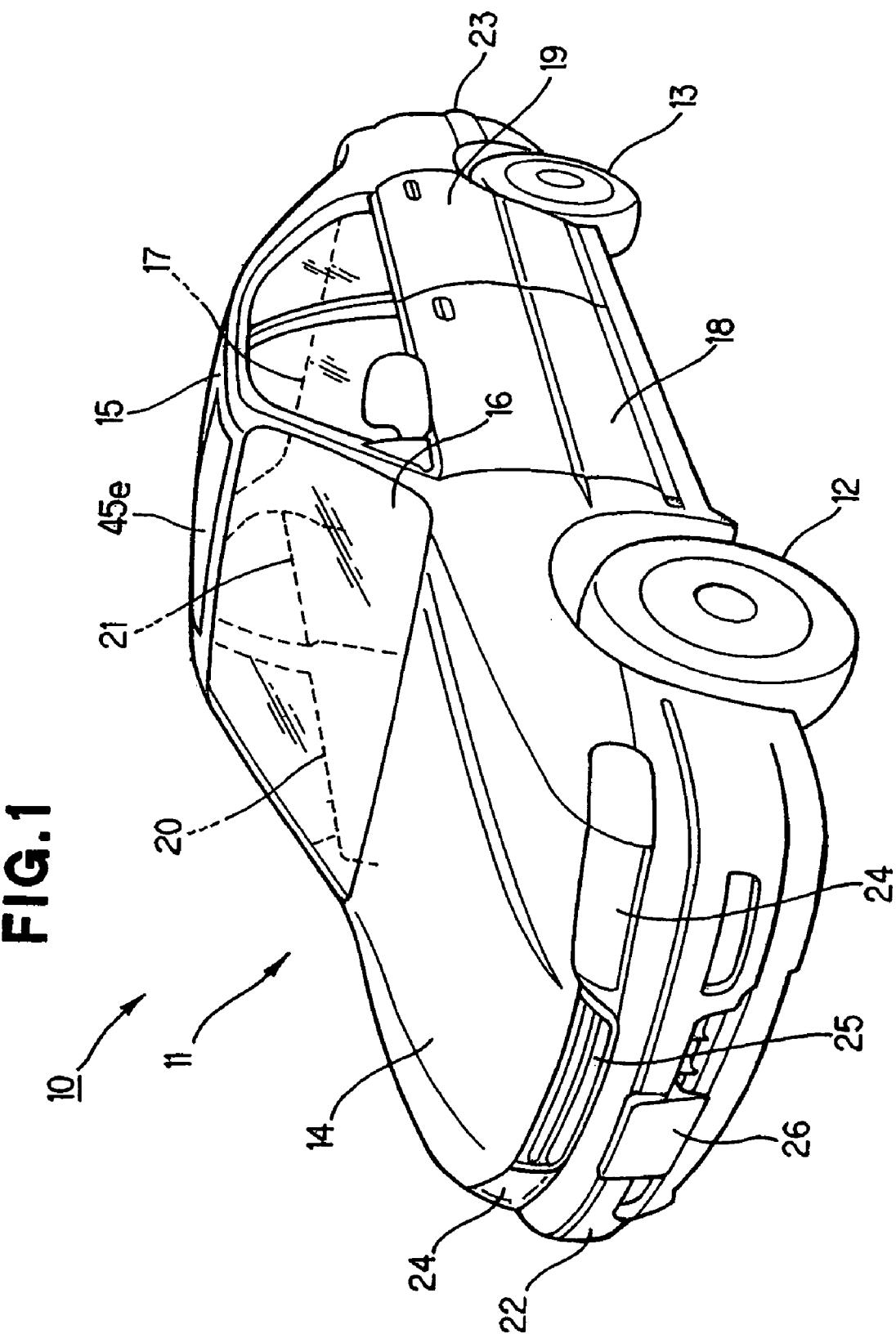
FIG. 1 is a perspective view showing the outer appearance of a vehicle provided with a power window system of the present invention.

FIG. 1 is a perspective view showing the outer appearance of a vehicle provided with a power window system of the present invention. Referring to FIG. 1, the outer appearance of a vehicle 10 is described. The vehicle 10 has a vehicle body 11, including a front wheel 12, a rear wheel 13, a hood 14, a roof 15, a front window 16, a rear window 17, a left front door 18 for a front passenger seat, a left rear door 19, a right front door 20 for a driver seat, and a right rear door 21. In FIG. 1, a reference numeral 22 denotes a front bumper, 23 a rear bumper, 24 a headlight, 25 a front grille, and 26 a number plate. The roof 15 of the vehicle 10 is provided with a sunroof 45e.

Figure 2:
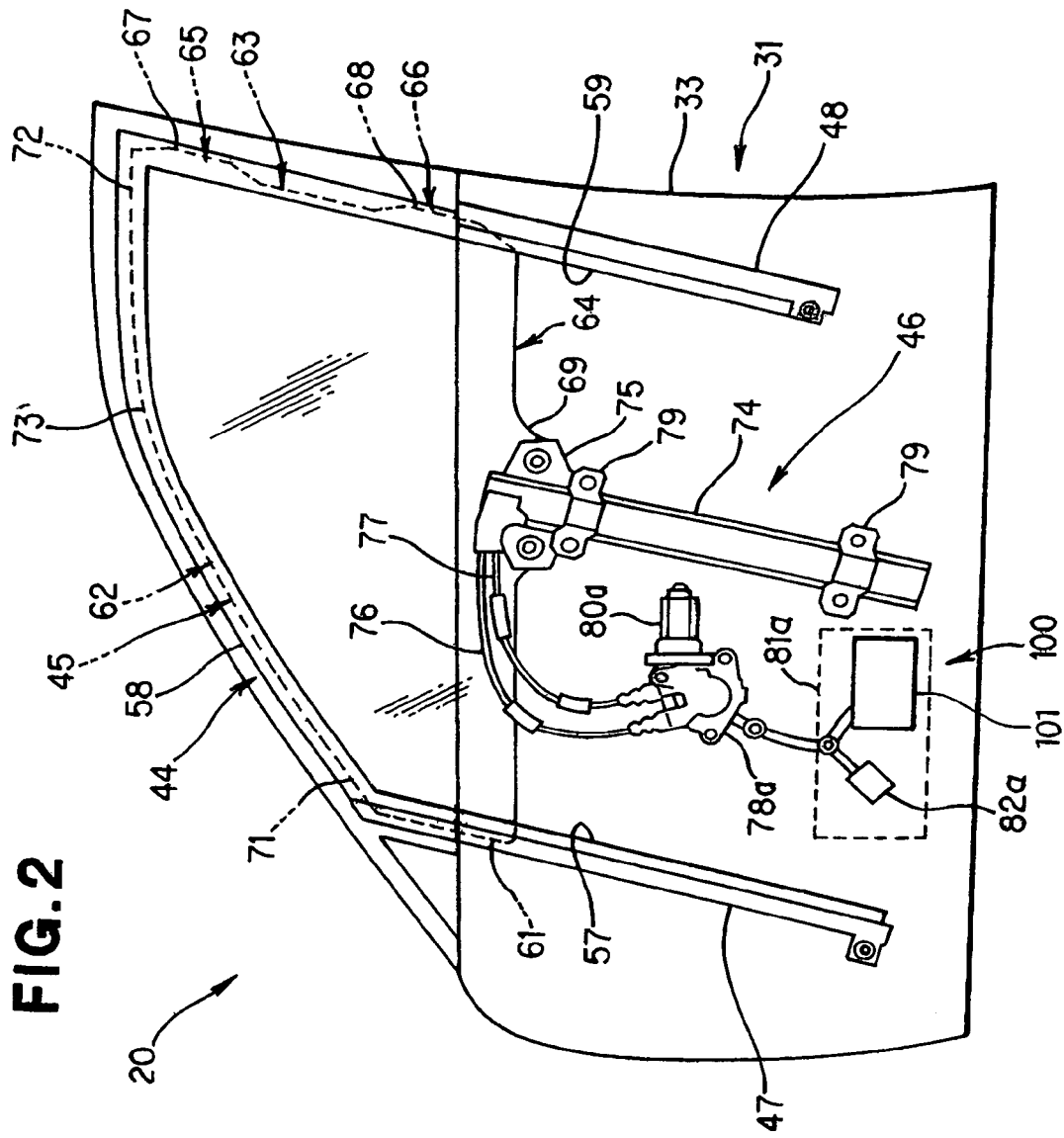
FIG. 2 is a side view showing the internal structure of a door of the vehicle provided with the power window system of the present invention.

Referring to FIG. 2, the right front door 20 is described in structure as an example. FIG. 2 is a side view showing the internal structure of the right front door 20 provided with the power window system of the present invention. The right front door 20 of FIG. 2 carries no ball seal, upper lining, or lining to show the internal structure thereof. A run channel 44 is provided with a front channel 57 to slide in contact with a front edge 61 of a seat window 45, an upper channel 58 to abut an upper edge 62 of the seat window 45, and a rear channel 59 to slide in contact with a rear edge 63 of the seat window 45.

The seat window 45 is a glass member having four edges, i.e., the front edge 61, the upper edge 62, the rear edge 63, and a lower edge 64. The rear edge 63 of the seat window 45 has protrusion portions 65 and 66 at its upper and lower positions respectively. These protrusion portions 65 and 66 are so placed as to slide in contact with the rear channel 59. Such a structure reduces the contact resistance of the seat window 45 when it moves up or down.

The upper protrusion portion 65 is formed linear with its vertex portion 67 being along the rear channel 59. The vertex portion 67 occupies the area of the rear edge 63 form the upper end to the center portion. Similarly, the lower protrusion portion 66 is also formed linear with its vertex portion 68 being along the rear channel 59. The vertex portion 68 occupies the area of the rear edge 63 from the lower end to the center portion. With the vertex portions 67 and 68 both formed linear as such, the manufacturing accuracy is improved, and the contact resistance is reduced for the seat window 45 when it moves up or down.

The upper edge 62 is so formed as to have less curvature than that of the upper run channel 58. As to the upper edge 62, a reference numeral 71 denotes an upper edge front end, 72 an upper edge rear end, and 73 a center portion. The lower edge 64 configures an attachment portion 69 for attachment to a regulator 46.

The regulator 46 is provided with a rail 74, a slide member 75, a feed cable 76, a feedback cable 77, and a drive unit 78. Here, the slide member 75 is attached to the rail 74 to freely slide, and connected with both the feed cable 76 and the feedback cable 77, which are driven by the drive unit 78. A member 79 provided to the upper and lower portions of the rail 74 is a bracket for fixing the rail 74 to a door body 31 at its lower portion 33. A front sash 47 is a member for supporting the front channel 57, and a center sash 48 is a member for supporting the rear channel 59.

The right front door 20 is attached with a part of a power window system 100. The power window system 100 partially attached to the right front door 20 includes a drive unit with a motor 80a, a master controller 81a, and a driver seat switch 82a. The master controller 81a drives and controls the motor 80a. The power window system 100 is attached to other doors 18, 19, and 21 with the similar structure.

Figure 3:
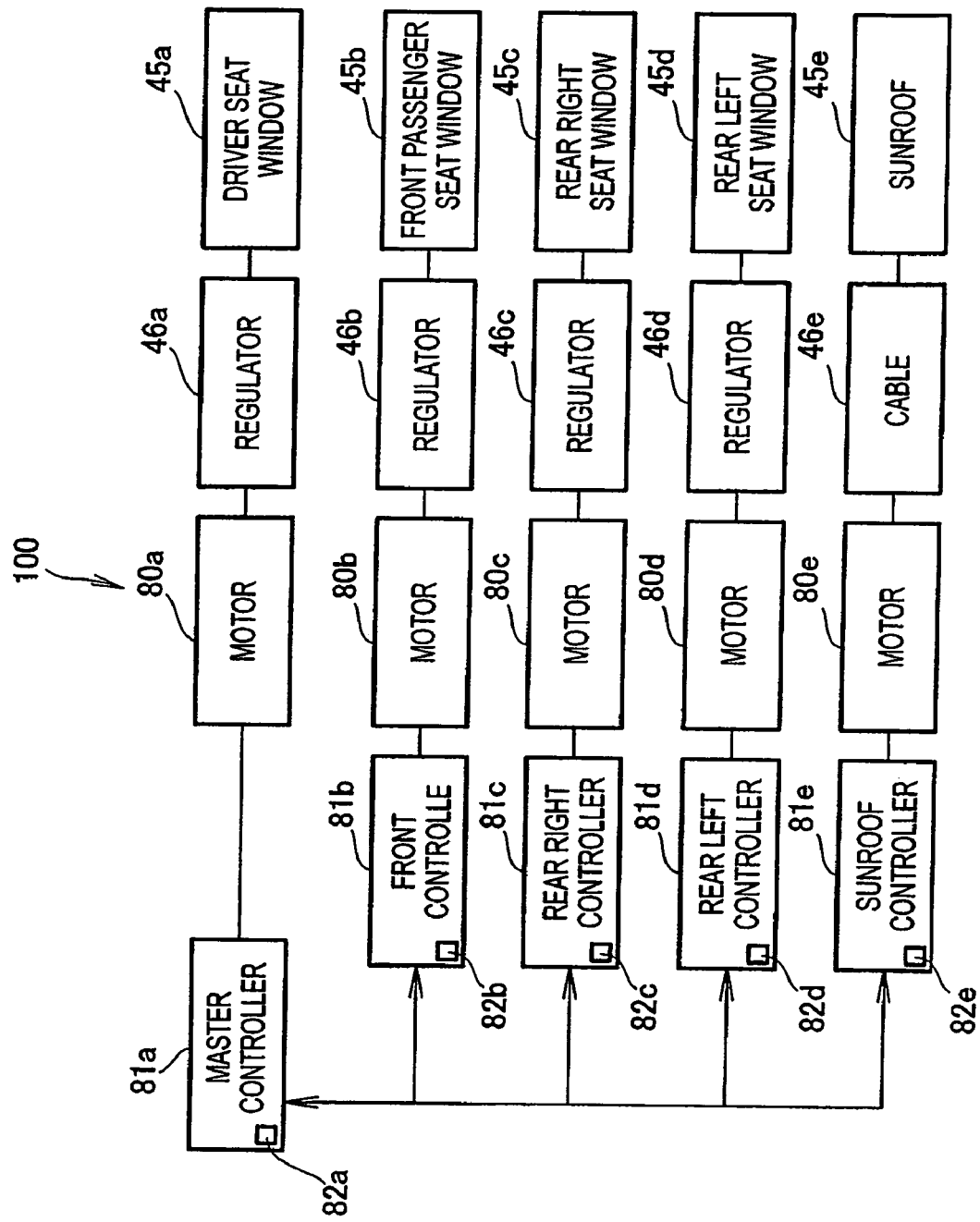
FIG. 3 is a block diagram showing the entire structure of the power window system in an embodiment of the present invention.

Referring to FIG. 3, described next is the entire structure of power window system 100. FIG. 3 shows a typical example of the power window system of the present invention.

The power window system 100 has five control systems for a driver seat window 45a, a front passenger seat window 45b, a rear right seat window 45c, a rear left seat window 45d, and a sunroof 45e. For each of those five control systems, the control device is provided with the master controller 81a, a front controller 81b, a rear right controller 81c, a rear left controller 81d, and a sunroof controller 81e. The master controller 81a corresponds to the driver seat, and other controllers 81b to 81d correspond to the remaining seats respectively. All of the front controller 81b, the rear right controller 81c, the rear left controller 81d, and the sunroof controller 81e are sub controllers being subordinate to the master controller 81a.

The control system for the driver seat window 45a is configured by the master controller 81a, the motor 80a connected to the master controller 81a, a regulator 46a to be driven by the motor 80a, and the driver seat window 45a that is opened and closed by the regulator 46a. The master controller 81a is provided with a driver seat switch 82a for issuing operation commands.

The control system for the front passenger seat window 45b is configured by the front controller 81b, a motor 80b connected to the front controller 81b, a regulator 46b to be driven by the motor 80b, and the front passenger seat window 45b that is opened and closed by the regulator 46b. The front controller 81b is provided with a front seat switch 82b for issuing operation commands. The front controller 81b is connected to the master controller 81a that serves as its host. The control system for the front passenger seat window 45b operates under the control of the master controller 81a.

The control system for the rear right seat window 45c is configured by the rear right controller 81c, a motor 80c connected to the rear right controller 81c, a regulator 46c to be driven by the motor 80c, and the rear right seat window 45c that is opened and closed by the regulator 46c. The rear right controller 81c is provided with a rear right seat switch 82c for issuing operation commands. The rear right controller 81c is connected to the master controller 81a that serves as its host. The control system for the rear right seat window 45c operates under the control of the master controller 81a.

The control system for the rear left seat window 45d is configured by the rear left controller 81d, a motor 80d connected to the rear left controller 81d, a regulator 46d to be driven by the motor 80d, and the rear left seat window 45d that is opened and closed by the regulator 46d. The rear left controller 81d is provided with a rear left seat switch 82d for issuing operation commands. The rear left controller 81d is connected to the master controller 81a that serves as its host. The control system for the rear left seat window 45d operates under the control of the master controlling 81a.

The control system for the sunroof 45e is configured by the sunroof controller 81e, a motor 80e connected to the sunroof controller 81e, a cable 46e to be driven by the motor 80e, and the sunroof of 45e that is opened/closed by the cable 46e. The sunroof controller 81e is provided with a switch 82e for issuing operation commands. The sunroof controller 81e is connected to the master controller 81a that serves as its host. The control system for the sunroof 45e operates under the control of the master controller 81a.

In the above structure, information such as control commands comes an goes from the master controller 81a to the sub controllers 81b to 81e with serial communications, e.g., LIN communications, and CAN communications. This reduces the required number of lines, favorably leading to less cost and weight. The issue here is that no signal exchange is allowed if some communications error occurs, e.g., controller failure occurring to any one of the master controller 81a and the sub controllers 81b to 81e, or ground (GND) short occurring to any harness that forms signal line connections from the master controller 81a to each of the sub controllers 81b to 81e.

Such communications errors do not occur that often, but once they occur, the seat windows and the sunroof are not closed. In the present embodiment, with the structure that will be described below, the seat windows and the sunroof can be eventually closed shut even if such communications errors occur.

Figure 4:
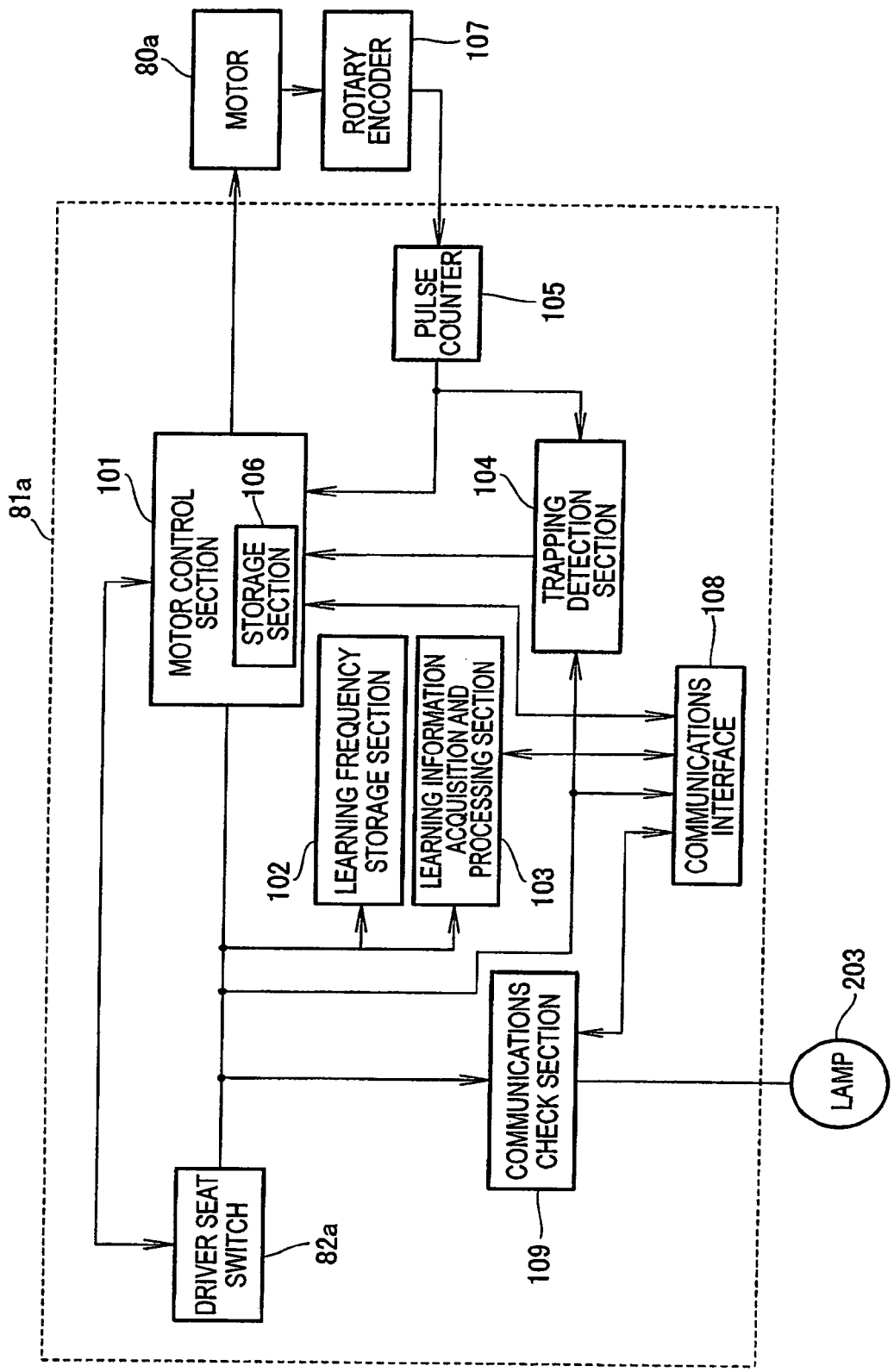
FIG. 4 is a block diagram showing the internal structure of a master controller.

FIG. 4 is a block diagram showing the internal structure of the above-described master controller 81a. The master controller 81a is provided with a motor control section 101, a learning frequency storage section 102, a learning information acquisition and processing section 103, a trapping detection section 104, a pulse counter 105, a communications interface 108, the driver seat switch 82a, and a communications check section 109. The motor control section 101 drives or stops the motor 80a depending on whether the driver seat switch 82a is turned ON or OFF. The motor control section 101 includes a storage section 106, which stores the count number provided by a pulse counter 105. The pulse counter 105 counts a pulse coming from a rotary encoder 107. The pulse is output from the rotary encoder 107 when the driver seat window 45a drives the motor 80a to close-up a fully-open window. Such pulse storage is learned at the time of vehicle assembly. The storage section 106 also stores the pulse count number when the driver seat window 45a stops its movement before completely going up or down. After the driver seat window 45a stops it movement, the master controller 81a computes the count number so that the driver seat window 45a is specified by position. The storage section 106 includes electrically erasable programmable read-only memory (in the below, referred to as "EEPROM"). The EEPROM stores information about the close-up position of the driver seat window 45a, which is erasable therein through electrical operation. When a signal "1" comes from the trapping detection section 104, the motor control section 101 operates the motor 80a in such a manner that the driver seat window 45a opens. When the driver seat switch 82a is operated to turn ON the switches for other seat windows, the communications check section 109 checks whether normal communications with the controllers for other seats is available. A setting is made so that no operation is allowed from other seat switches 82b to 82d during when the driver seat switch 82a is depressed.

The learning frequency storage section 102 stores how many times the close-up position of the window 45a is learned. The learning frequency storage section 102 is structured so that such data is erasable therein. The learning information acquisition and processing section 103 detects the learning frequency provided by the sub controllers 81b to 81e via the communications interface 108, and stores it in the learning frequency storage section (e.g., indicated by a reference numeral 102b in FIG. 7). When the detected information indicates that the learning frequency is 0, the learning information acquisition and processing section 103 forwards an ON signal to a switch 116b (exemplarily shown in FIG. 7) so that the switch 116b is accordingly turned ON. This enables motor control when the driver seat switch 82a is turned ON. When the detected information indicates that the learning frequency is not 0, the learning information acquisition and processing section 103 forwards an OFF signal to the switch 116b so that the switch 116b is accordingly turned OFF. This blocks signals coming from the driver seat switch 82a via the communications interface 108.

When the driver seat switch 82a is ON, and when the count number from the pulse counter 105 shows no change, the trapping detection section 104 determines that "trapping" is occurring, and forwards a signal "1" to the motor control section 101. The count number at the time of learning is also stored. When the count number shows no change at the time of pulse counting with the window completely closed, a trapping signal is cancelled, and signal transmission is performed via the motor control section 101 to turn OFF the driver seat switch 82a. When a determination is made that no "trapping" is occurring, a signal "0" is transmitted. When the signal coming from the trapping detection section 104 indicates "0", the motor control section 101 retains the state, and when the signal indicates "1", drives the motor 80a in reverse so as to open the driver seat window 45a.

The communications interface 108 is used for signal transmission and reception between the master controller 81a at the driver seat and the sub controllers 81b to 81e for the remaining seats and the sunroof.

Figure 5:
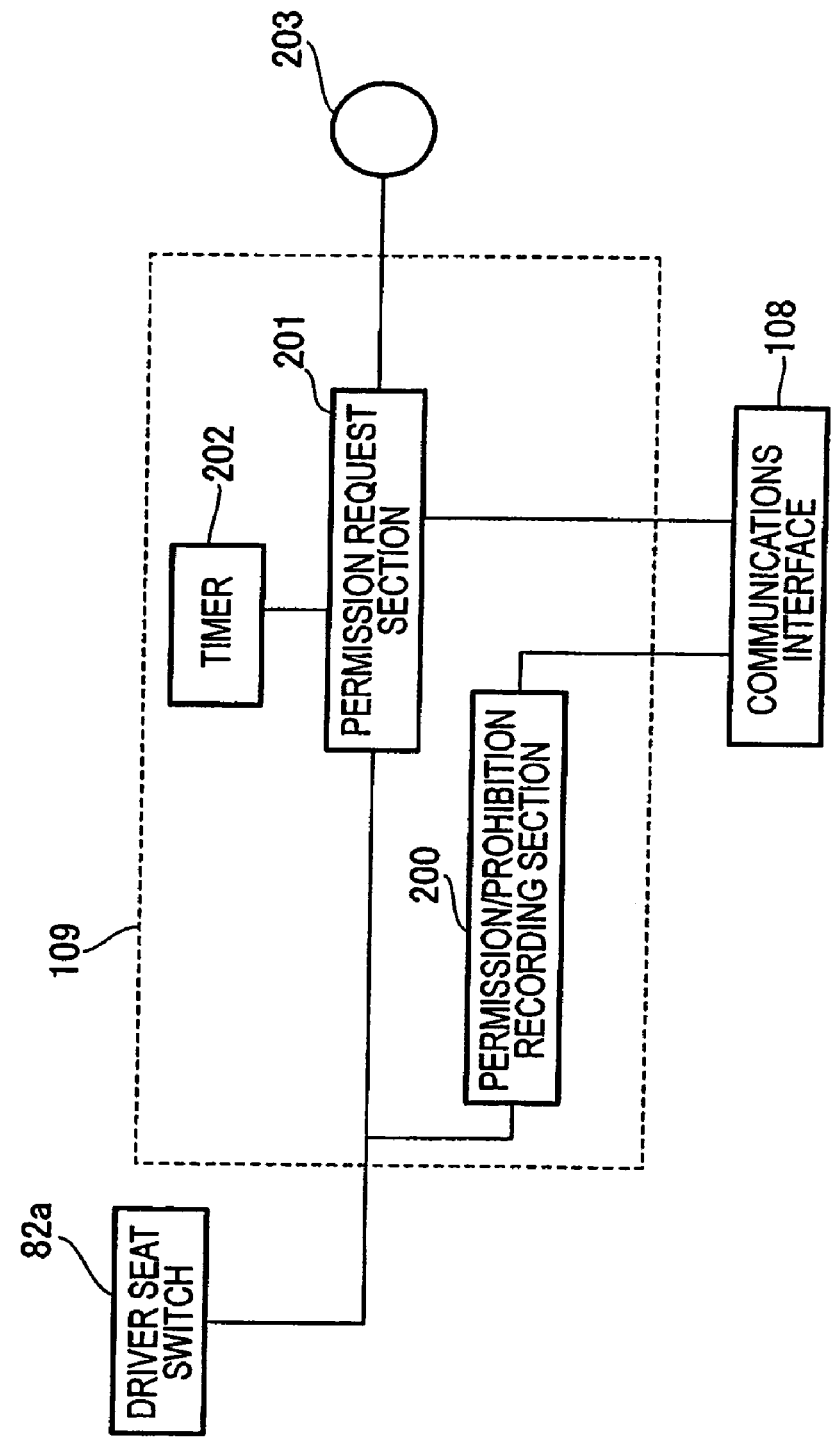
FIG. 5 is a block diagram showing the internal structure of a communications check section.

FIG. 5 is a block diagram showing the structure of the communications check section 109, which is configured by a permission/prohibition recording section 200, a permission request section 201, and a timer 202. The permission/prohibition recording section 200 records prohibition data that is for allowing, when the driver seat switch 82a is being operated, operation of only the switch for the target seat. When the driver seat switch 82a is not operated, permission data to activate the switches for the seats other than the target seat is recorded in the permission/prohibition recording section 200. When the driver seat switch 82a is turned ON, the permission request section 201 reads data related to a permission or prohibition issued by the operation command section for the seats other than the target seat, and checks whether the data is permission data or prohibition data. The timer 202 turns ON the driver seat switch 82a, and measures the time taken for the permission data to come after the permission request section 201 makes a request therefore to the controllers for the seats other than the target seat. If the permission data does not come within a predetermined time, a lamp 203 is illuminated to indicate a communications failure. When the prohibition data comes, the lamp 203 flashes, and with the permission data, the corresponding seat window is accordingly opened or closed.

Figure 6:
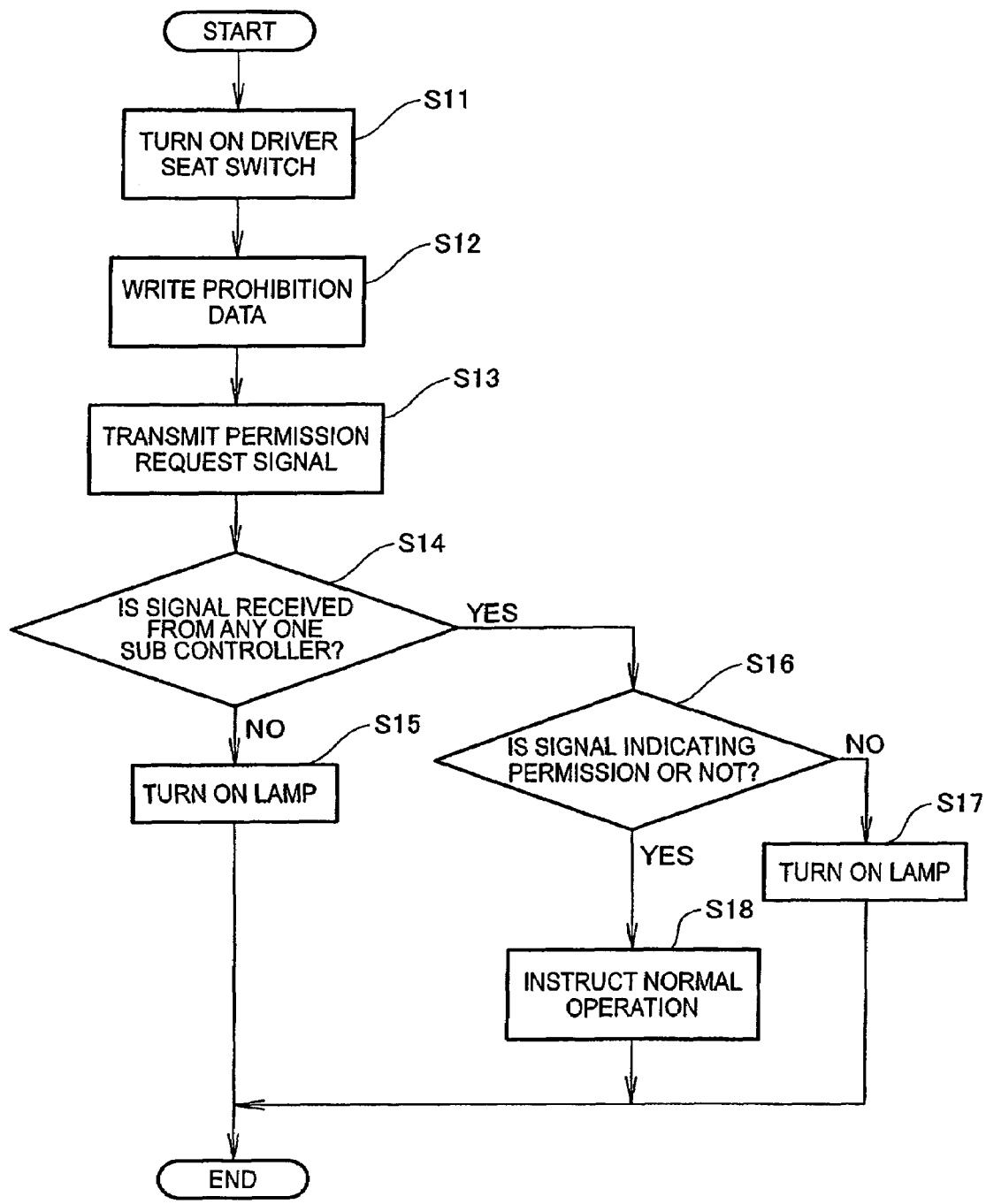
FIG. 6 is a flowchart showing the operation of the communications check section.

FIG. 6 is a flowchart showing the operation of the communications check section 109. The driver seat switch 82a is turned ON (step S11). The permission/prohibition recording section 200 is written with prohibition data (step S12). The permission request section 201 forwards a permission request signal (step S13). In response, the timer 202 is activated to see whether permission or prohibition data is provided from any one sub controller for the passenger seats within a predetermined time (Step S14). If no such data is provided from the sub controllers for the passenger seats, the lamp 203 is illuminated to indicate a communications failure (step S15). If such data is provided within a predetermined time, a determination is made whether the signal is indicating permission or not (step S16). If determined that the signal is indicating the prohibition data, the lamp flashes (step S17). If determined that the signal is indicating the permission data, the operation command section of the corresponding sub controller forwards the normal operation to a motor control section so that the seat window is accordingly opened or closed (step S18).

Figure 7:
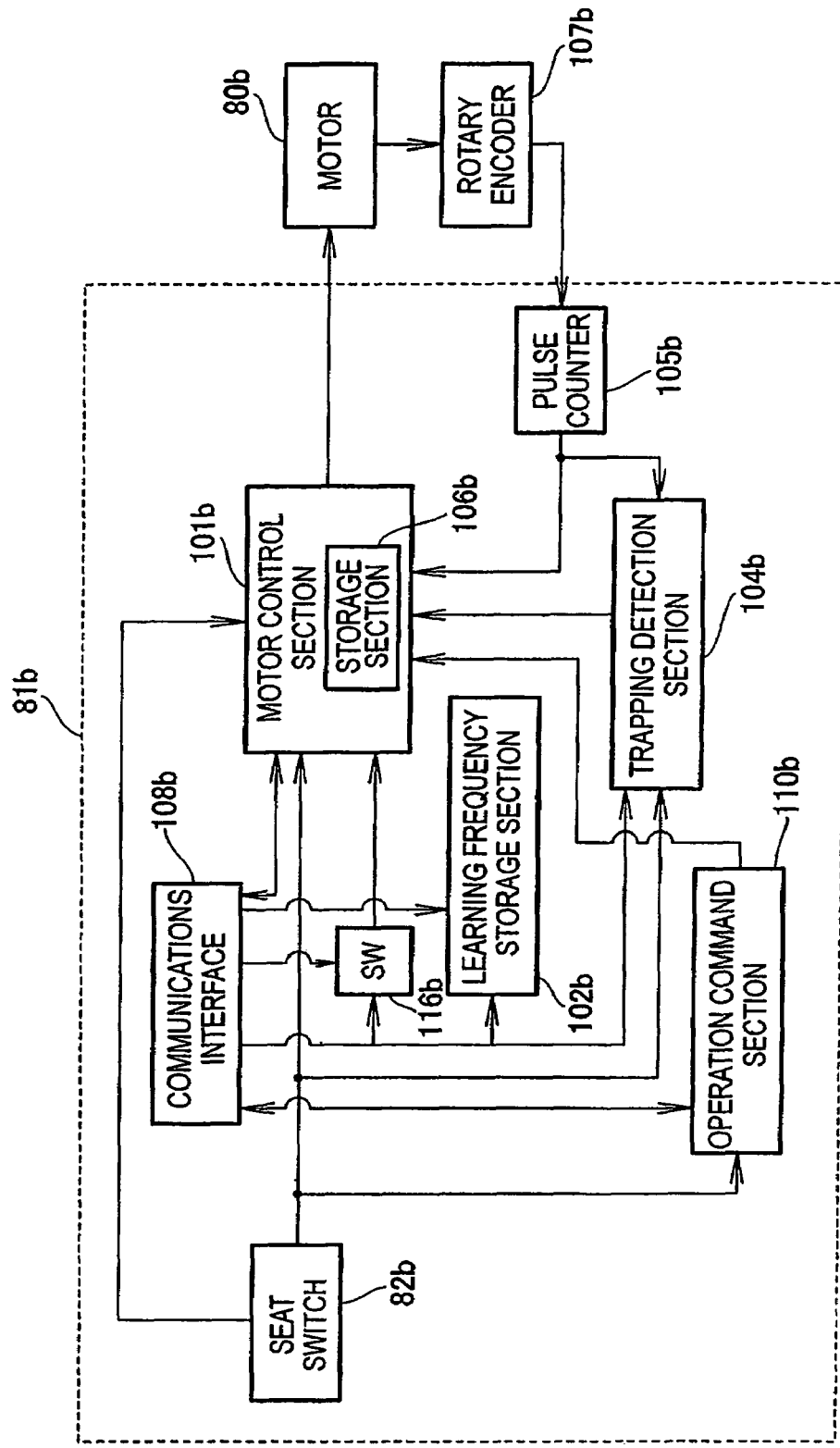
FIG. 7 is a block diagram showing the internal structure of a sub controller (front controller)

FIG. 7 is a block diagram showing the internal structure of the sub controllers 81b 81e These four sub controllers are all the same. Herein, the front controller 81b is exemplified as a sub controller. The front controller 81b is provided with a motor control section 101b, a learning frequency storage section 102b, the switch (SW) 116b, a trapping detection section 104b, a pulse counter 105b, a communications interface 108b, the seat switch 82b, and an operation command section 110b. The switch 116b is turned ON or OFF depending on a signal coming from the master controller. Based on whether the seat switch 82b is ON or OFF, the motor control section 101b drives or stops the motor. The motor control section 101b includes a storage section 106b, which stores the count number (information about the window close-up position) provided by the pulse counter 105b when the motor is driven to close-up a fully-open window. Such pulse storage is learned at the time of vehicle assembly when the driver seat switch 82a is turned ON with the switch 116b being ON. The storage section 106b also stores the pulse count number when the window stops its movement before completely going up or down. After the window stops its movement, the count number is computed so that the seat window is specified by position. The storage section 106b includes electrically erasable programmable read-only memory (EEPROM). The EEPROM stores information about the close-up position of the seat window, which is erasable therein through electrical operation. When a signal "1" comes from the trapping detection section 104b, the motor 80b is driven is such a manner that the seat window opens. When any switch for other seat windows is operated to be ON, the operation command section 110b checks whether normal communications with master controller 81a at the driver seat is available. An operation command to be forwarded to the motor control section 101b under normal communications is different from the one under the abnormal communications. A setting is made so that no operation is allowed from the driver seat switch during when any other seat switch is depressed.

The learning frequency storage section 102b stores how many times the close-up position of the seat window is learned. The storage contents are erasable. The learning frequency is forwarded to the master controller 81*a*. When the learning frequency is 0, the master controller 81*a* forwards an ON signal to the switch 116*b* to turn ON the switch 116*b*, and when the driver seat switch 82*a* is turned ON, motor control is enabled. When the learning frequency is not 0, the master controller 81*a* forwards an OFF signal to the switch 116*b* to turn OFF the switch 116*b*, and signals coming from the driver seat switch 82*a* are all blocked.

When the seat switch 82*b* is ON, and when the count number from the pulse counter 105*b* shows no change, the trapping detection section 104*b* determines that "trapping" is occurring, and forwards a signal "1" to the motor control section 101*b*. The count number at the time of learning is also stored. When the count number shows no change at the time of pulse counting with the window completely closed, a trapping signal is cancelled, and a signal transmission is performed via the motor control section 101*b* to turn OFF the seat switch 82*b*. When a determination is made that no "trapping" is occurring, a signal "0" is transmitted. When the signal coming from the trapping detection section 104*b* indicates "0", the motor control section 101*b* retains the state, and when the signal indicates "1", drives the motor 80*b* in reverse so as to open the front passenger seat window.

When the switch is turned ON, the operation command section 110*b* asks the master controller 81*a* for an operation permission. When the operation permission is read within a predetermined time after the request, the operation command section 110*b* forwards a normal operation command signal to the motor control section 101*b*. In response, the motor control section 101*b* executes a normal operation program to open or close the corresponding seat window or the sunroof in a normal manner. When the operation command section 110*b* receives a signal indicating operation prohibition, the motor 80*b* is not operated. After the request is made for an operation permission, if neither permission data nor prohibition data is acquired for a predetermined length of time, the operation command section 110*b* determines that some communications error is occurring, and issues a communications failure operation command. At this time, the operation program of the motor control section 101*b* and the communications failure program are executed. With this operation program, when the switch is continuously depressed for a predetermined duration, the seat window is closed by a predetermined amount (10 mm). By repeating such switch operation, the seat window can be closed shut.

Alternatively, through operation of the driver seat switch 82*a* via the communications interface 108*b*, control can be exercised over any seat windows or the sunroof to open or close.

Figure 8:
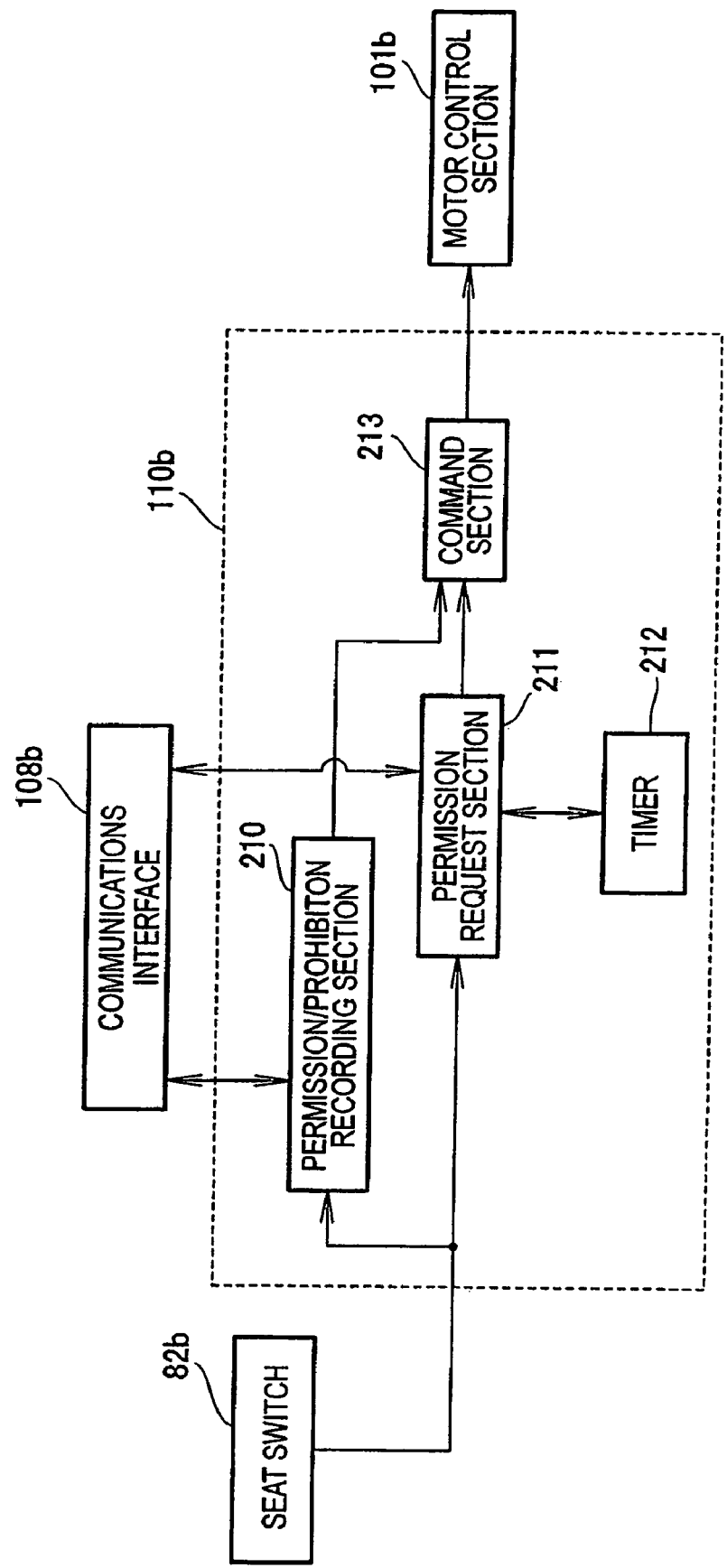
FIG. 8 is a block diagram showing the internal structure of an operation command section.

FIG. 8 is a block diagram showing the structure of the operation command section. The operation command section 110*b* is provided with a permission/prohibition recording section 210, a permission request section 211, a timer 212, and a command section 213. The permission/prohibition recording section 210 records prohibition data that is for not allowing operation of the driver seat switch 82*a* when the front seat switch 82*b* is being operated. When the front seat switch 82*b* is not operated, permission data to activate the driver seat switch 82*a* is recorded in the permission/prohibition recording section 210. When the front seat switch 82*b* is turned ON, the permission request section 211 reads the permission/prohibition section 200 of the communications check section 109 to check whether there is permission data or prohibition data. The timer 212 turns ON the front seat switch 82*b*, and counts the time taken for the permission data to come after the permission request section 211 makes a request therefore to the master controller 81*a*. If the permission data does not come within a predetermined time, it is determined as being a communications failure, and a communications failure signal, e.g., 2-bit signal "11" is forwarded to the command section 213. When prohibition data comes, a prohibition signal, e.g., 2-bit signal, e.g., 2-bit signal "10" is forwarded to the command section 213, and when permission data comes, a permission signal, e.g., 2-bit signal "01" is forwarded to the command section 213. The command section 213 forwards the motor control section 101*b* a normal operation command signal in response to a permission signal, a non-operation command signal in response to a prohibition signal, and a communications failure operation command signal in response to a communications failure signal.

Figure 9:
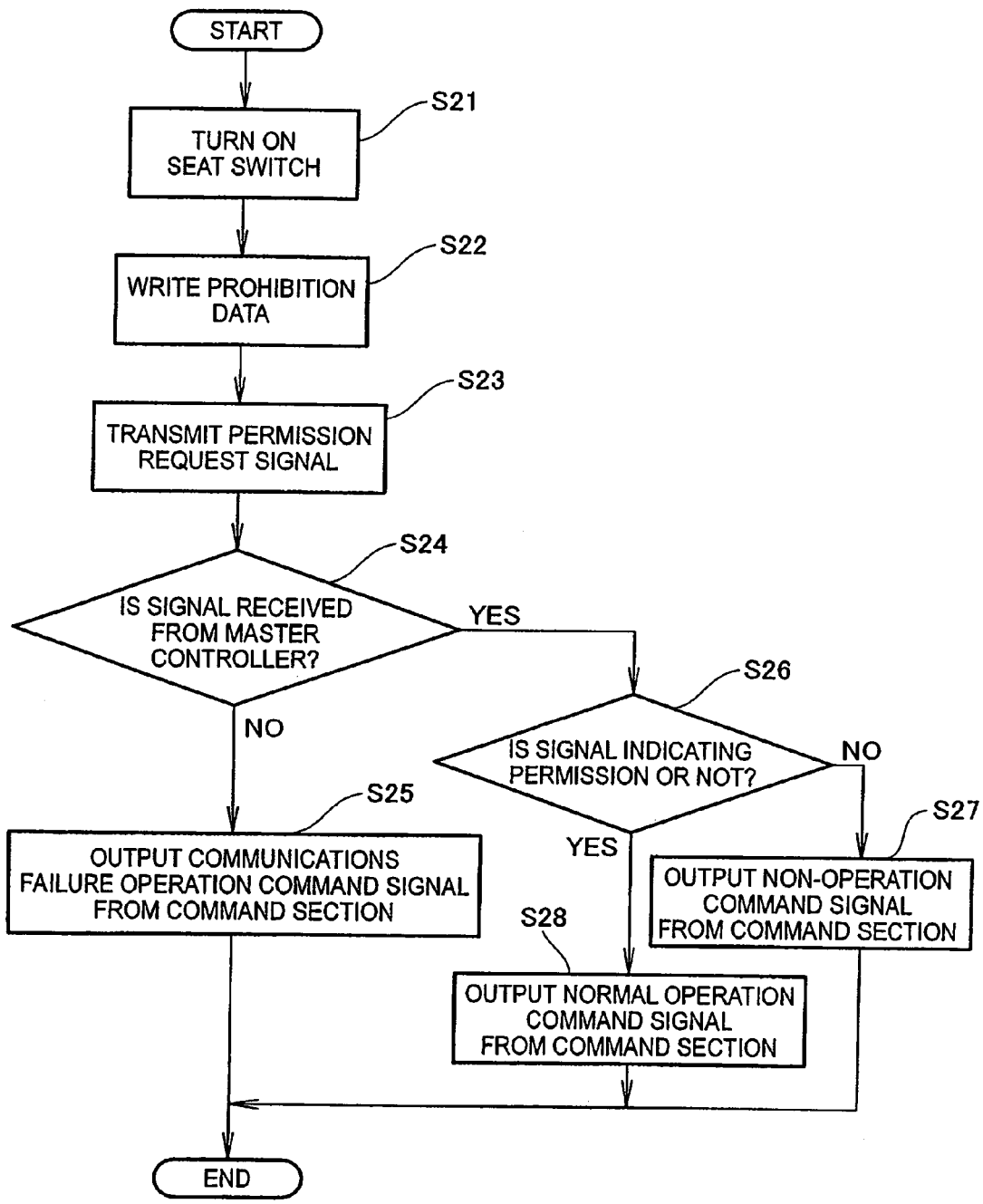
FIG. 9 is a flowchart showing the operation of the operation command section.

FIG. 9 is a flowchart showing the operation procedure of the operation command section 110*b*. The front seat switch 82*b* is turned ON (step S21). The permission/prohibition recording section 210 is written with prohibition data (step S22). The permission request section 211 forwards a permission request (step S23). In response, the timer 212 is activated to see whether a permission or prohibition signal is provided within a predetermined time (Step S24). If no such signal is provided, it is determined as being a communications failure, and the command section 213 outputs a communications failure operation command signal (step S25). If such signal is provided within a predetermined time, a determination is made whether the signal is indicating permission or not (step S26). If determined that the signal is indicating prohibition, the command section 213 forwards a non-operation command signal to the motor control section 101*b* (step S27). With a permission signal, the command section 213 forwards a normal operation command signal to the motor control section 101B (step S28) so that the front passenger seat window 45*b* is accordingly opened or closed.

Figure 10:
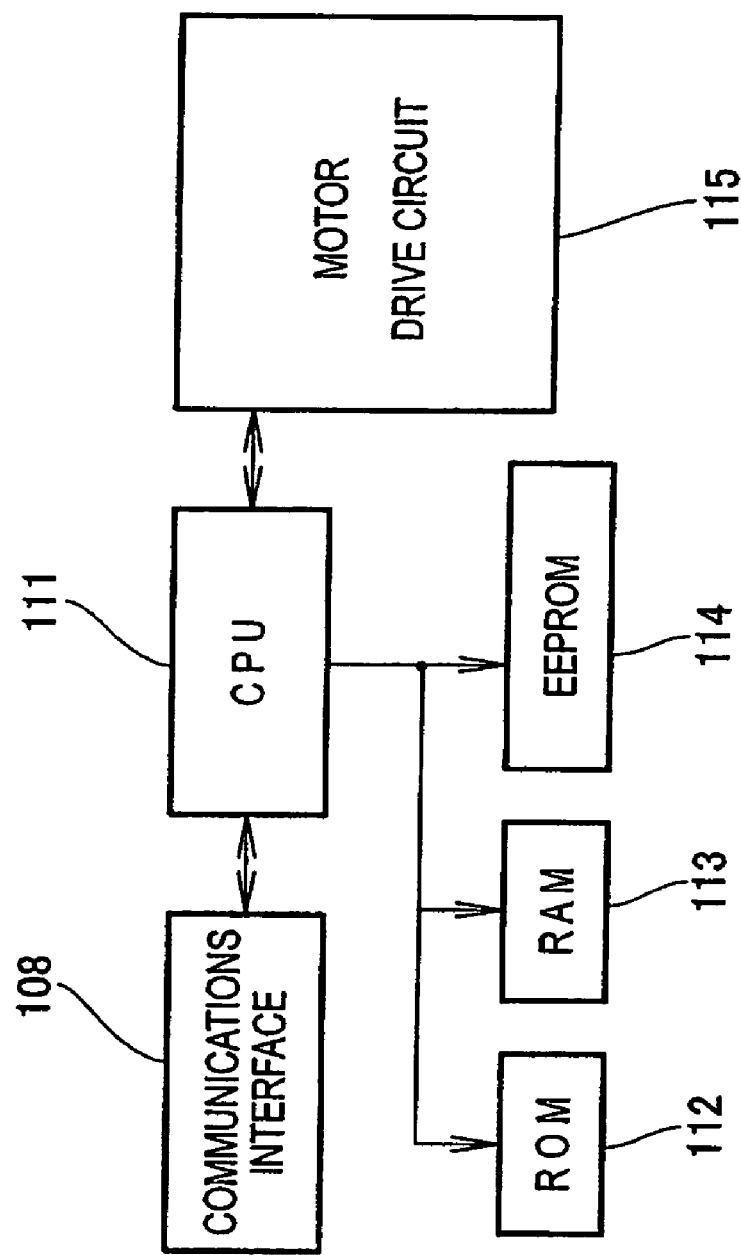
FIG. 10 is a block diagram showing the general internal structure of a control device.

FIG. 10 shows the basic structure of the master controller 81*a*, and the sub controllers 81*b* to 81*e*. The master controller 81*a* and others are provided with, basically, the communications interface 108, a CPU 111, ROM 112, RAM 113, EEPROM 114, and a motor drive circuit 115. The ROM 112 exemplarily stores a control program related to operation control over the seat windows. The RAM 113 stores the position of the seat windows based on the count number provided by the pulse counter for the standstill seat windows. The EEPROM 114 stores information about every seat window e.g., information about the close-up position of the seat window.

Figure 11:
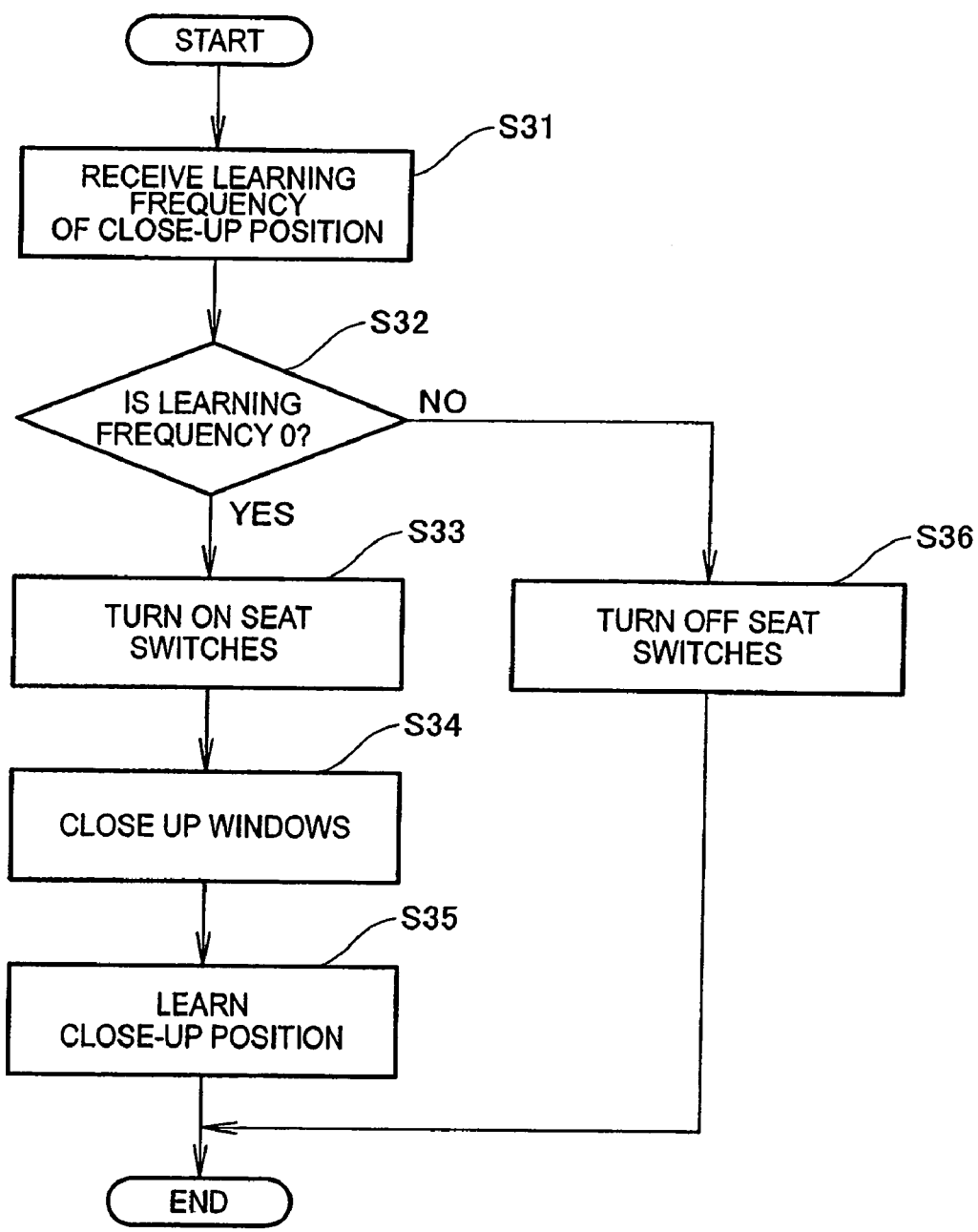
FIG. 11 is a flowchart showing the procedure of close-up learning in the power window system in the embodiment of the present invention.

With reference to the flowchart of FIG. 11, described next is close-up leaning in the power window system of the present embodiment.

The master controller 81*a* carries out communications with the sub controllers 81*b* to 81*e*, and receives information indicating the learning frequency of the close-up position for the respective seat windows, and YES-NO information about the close-up leaning for the respective seat windows (step S31). Thereafter, a determination is made whether the learning frequency is 0 or not (step S32). When determined that the learning frequency is 0 for every controller, i.e., no position learning, (step S32), the switches (only one being shown in FIG. 7 as designated by 116*b*) are all turned ON (step S33). When the driver seat switch 82*a* is operated, the sub controllers 81*b* to 81*d* responsively close-up their own fully-open windows (step S34). The resulting window position is regarded as fully-closed or close-up position, and based thereon, position learning is made (step S35).

When the learning frequency for the close-up position of the seat windows is not 0, or when any sub controller is missing, the switches (only one 116b being shown in FIG. 7) are all turned OFF, and this mode is not activated (step S36).

Referring to the flowcharts of FIGS. 12 and 13, described next is the seat door open/close operation with the power window system of the present embodiment.

Described first is the operation to close any passenger seat window by using the driver seat switch 82a. The switch 82a is turned ON (step S40) to check whether normal communications is available (step S41). If the communications is determined as being normally available, another determination is made whether there is an operation permission (step S42). If there is no such operation permission, the motor does not run (step S43), and with an operation permission, the procedure follows the flowchart of FIG. 13 (step S44).

The motor 80B runs, and the seat window starts moving up (step S4401). At this time, the trapping detection section 104b detects whether any "trapping" is occurring, and determines whether a trapping signal is generated (step S4402). If the signal is indicating "0") that means no trapping, the motor 80b keeps running, and another determination is made whether the seat window is at its close-up position or not (step S4403). If the seat window is not at its close-up position, the motor keeps running. If the seat window is at its close-up position, the switch 82a is turned OFF (step S4404). If determined in step S4402 that some "trapping" is occurring, the motor is driven in reverse (step S4405), and the switch is turned OFF (step S4407) after the seat door is fully open (step S4406).

Figure 12:
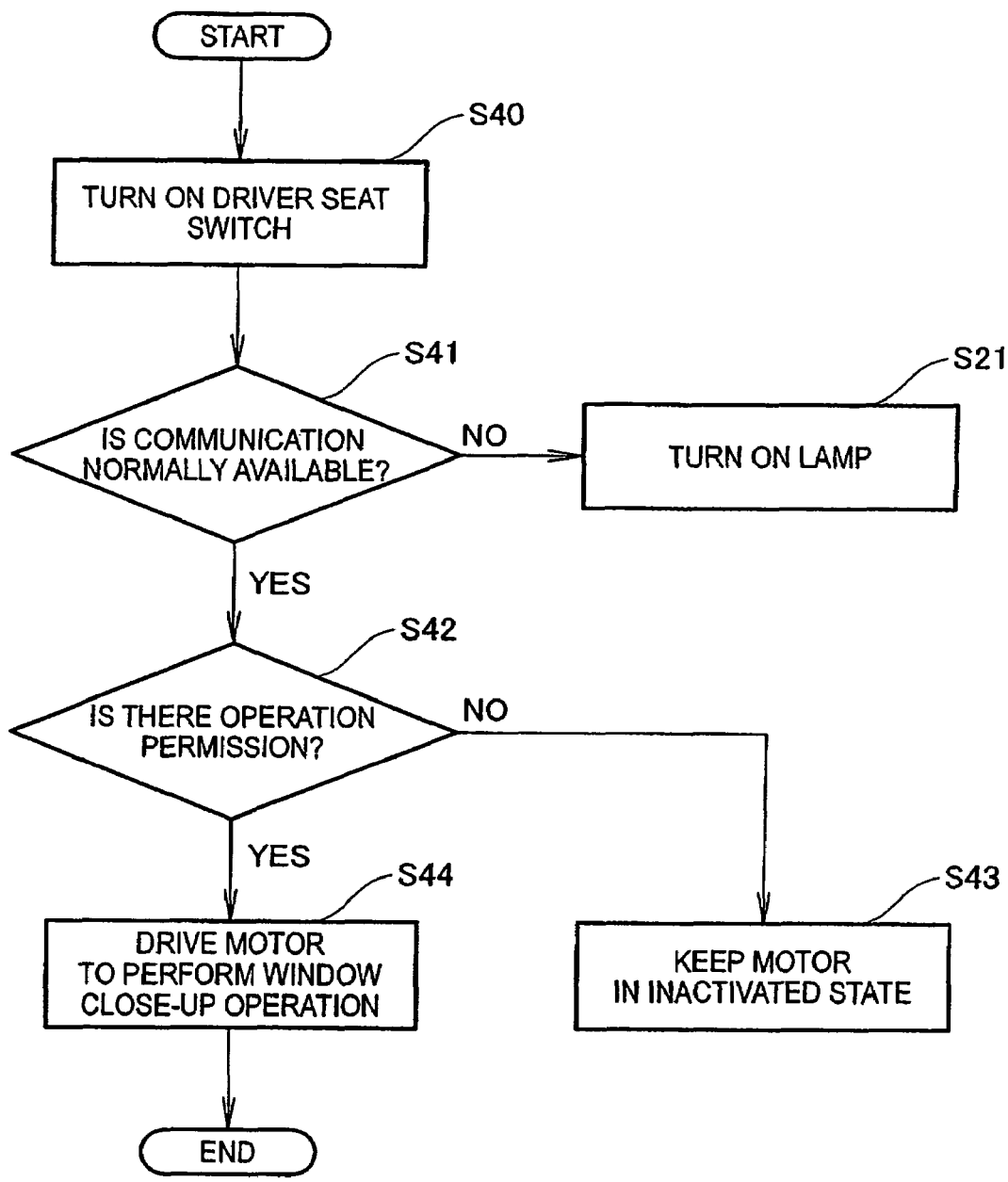
FIG. 12 is a flowchart showing the open/close operation with power window system in the embodiment of the present invention.
Figure 13:
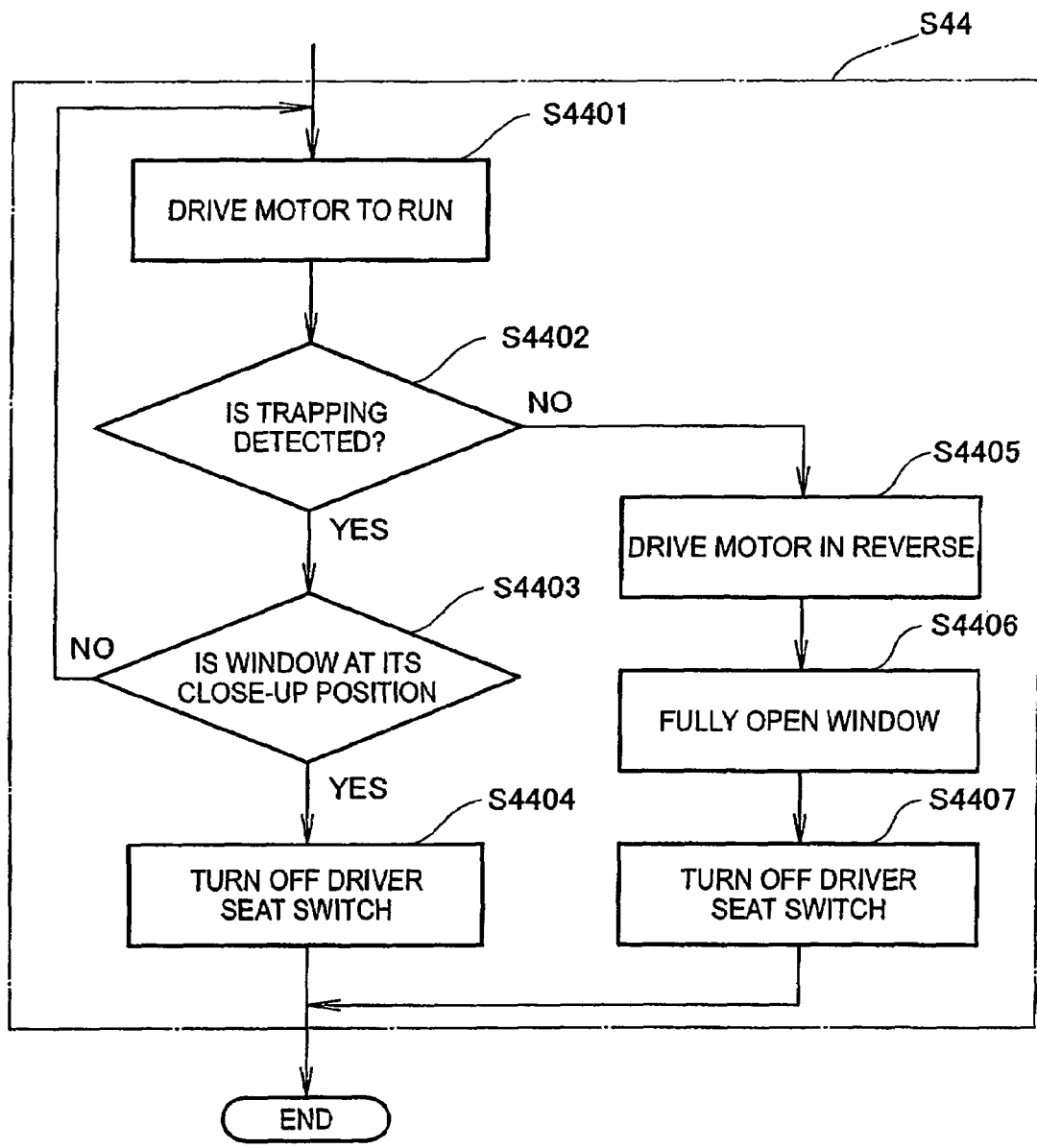
FIG. 13 is another flowchart showing the open/close operation with the power window system in the embodiment of the present invention.

When the communications is determined as not being normal in step S41 of FIG. 12, the lamp is illuminated (step S45).

Referring to the flowcharts of FIGS. 14 and 15, described next is the switch operation at the passenger seats except for the driver seat. Although exemplified here is the switch operation at the front passenger seat, the remaining seats and the sunroof are also similarly operated. The switch is turned ON (step S50) to see whether normal communications is available (step S51). If the communications is normally available, a determination is made whether there is an operation permission (step S52). If there is no such operation permission, the motor does not runt (step S53), and with an operation permission, the procedure follows the flowchart of FIG. 15 (step S54).

To close the seat window, the motor 80b starts running, and the seat window moves up (step S5401). At this time, the trapping detection section 104b detects whether any "trapping" is occurring, and determines whether a trapping signal is generated (step S5402). If the signal is indicating "0" that means no trapping, the motor 80b keeps running, and another determination is made whether the seat window is at its close-up position or not (step S5403). If the seat window is not at its close-up position, the motor keeps running. If the seat window is at its close-up position, the switch 82a is turned OFF (step S5404). If determined in step 55402 that some "trapping" is occurring, the motor is driven in reverse (step S5405), and the switch is turned OFF (step 55407) after the seat door is fully open (step S5406).

Figure 14:
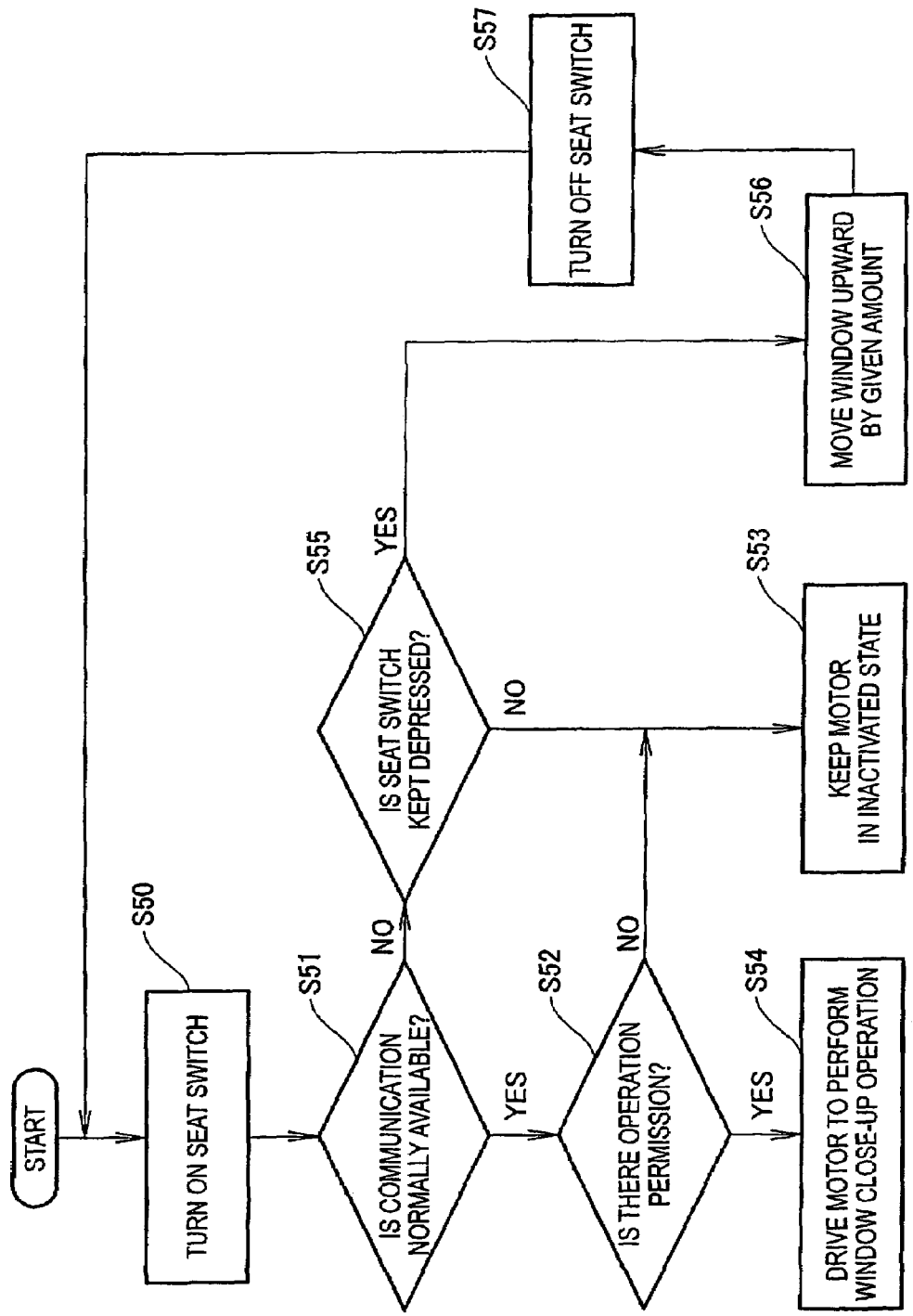
FIG. 14 is still another flowchart showing the open/close operation with the power window system in the embodiment of the present invention.
Figure 15:
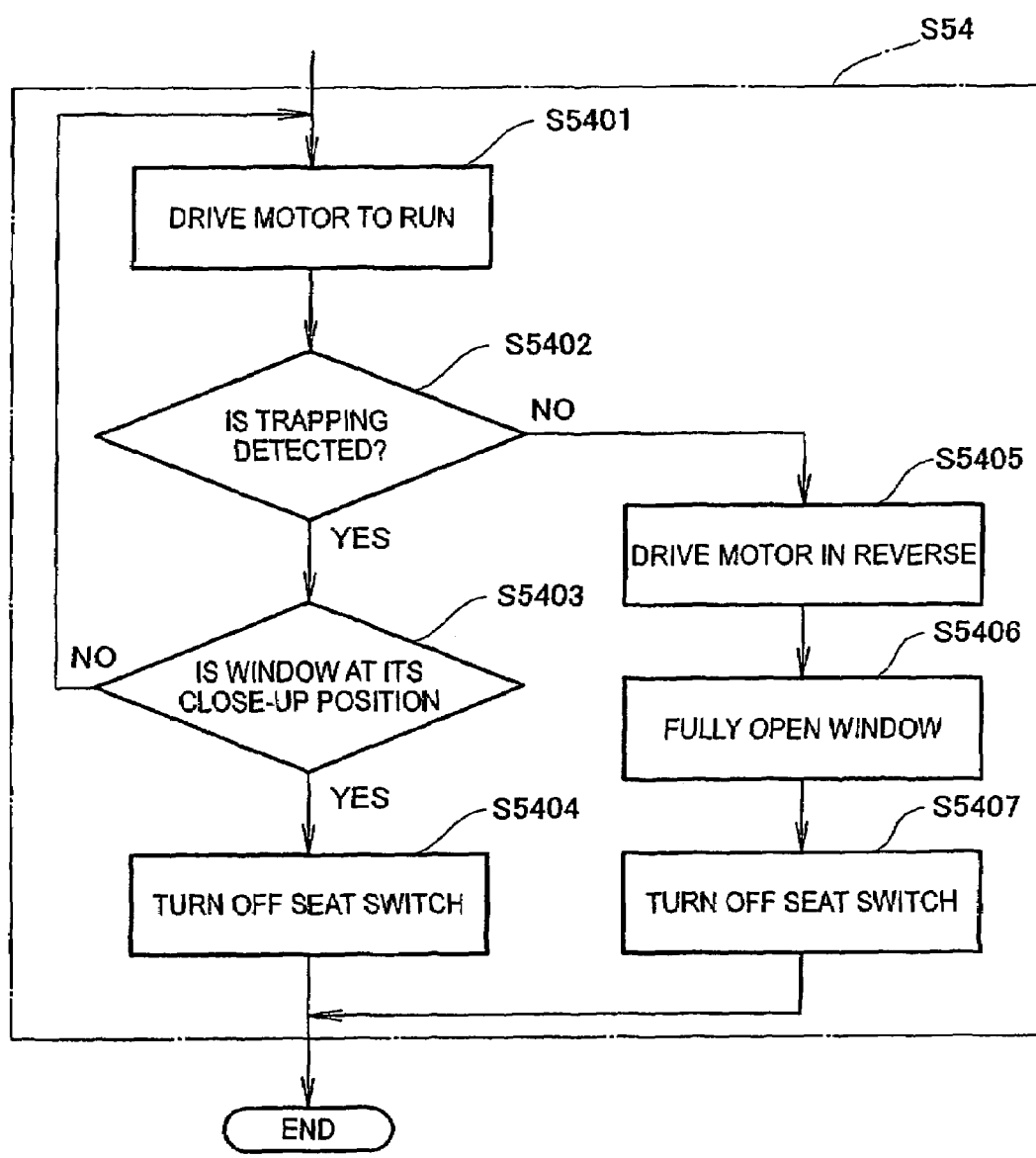
FIG. 15 is still another flowchart showing the open/close operation with the power window system in the embodiment of the present invention.

In FIG. 14, when normal communications is not available, a determination is made whether the switch is kept depressed (step S55). If the switch is not kept depressed, the motor does not run (step S53). If the switch is kept depressed for a predetermined duration, the seat window accordingly moves up by the given amount (step S56). When any "trapping" is detected at this time, the motor is driven in reverse, and the seat window and the sunroof accordingly move in the direction opposite to the close-up position. When the switch is turned OFF, the operation is responsively stopped (step S57), and the procedure is put in a wait state.

As described in the foregoing, even if communications failure occurs, a close-up mode can prepare for the worst, and the possibility of seat windows not closing is eliminated. This favorably allows system configuration without causing cost and weight increases that often result from communications duplications.

Obviously, various minor changes and modifications of the present invention are possible in the light of the above teaching. It is therefore to be understood that within the scope of the appended claims the invention may be practiced otherwise than as specifically described.

What is claimed is:

1. A power window system, comprising:
    an open/close switch for issuing an open/close instruction to a seat window that is provided to each of a plurality of vehicle seats;
    control means for controlling an open-close operation of the seat windows based on an operation of the open/close switches, and is configured by as many as the vehicle seats with a one-to-one relationship therebetween; and
    communication means for carrying out bidirectional communications between the control means at a driver seat and the control means at the remaining vehicle seats,
    wherein even if a close signal is issued from one of the open/close switches of a vehicle seat other than the driver seat and permission is not granted by the control means at the driver seat due to a communications malfunction, the control means at the associated vehicle seat is provided with operation command means, forwarding, a command to the associated motor control means to move the corresponding seat window in a direction to close by a predetermined close amount.

2. The power window system according to claim 1, wherein the control means includes a trapping detection means that detects trapping if occurred when the seat window is closed.

* * * * *